United States Patent [19]

Sulzyc

[11] Patent Number: 5,395,164
[45] Date of Patent: Mar. 7, 1995

[54] OPERATING BRAKE VALVE FOR AN ELECTRICALLY AND PNEUMATICALLY ACTUATED BRAKING SYSTEM IN A MOTOR VEHICLE

[75] Inventor: Jerzy Sulzyc, Eppelheim, Germany

[73] Assignee: Grau GmbH, Heidelberg, Germany

[21] Appl. No.: 60,799

[22] Filed: May 12, 1993

[30] Foreign Application Priority Data

Sep. 28, 1992 [DE] Germany .......... 42 32 492.0

[51] Int. Cl.⁶ .......... B60T 15/04; B60T 15/14; B60T 13/68
[52] U.S. Cl. .......... 303/15; 303/14; 303/28; 303/50; 303/DIG. 3; 303/20; 303/3; 188/151 A
[58] Field of Search .......... 303/15, 7-8, 303/28-30, 13, 14, 16-18, 9, 2-3, 50-56, 9.66, 6.01, DIG. 3, DIG. 2, DIG. 4, 20, 40, 118.1, 113.4; 137/627.5; 188/151 A, 106 P, 156, 159-165; 74/510, 512

[56] References Cited

U.S. PATENT DOCUMENTS

| | | | |
|---|---|---|---|
| 4,002,373 | 1/1977 | Mori | 303/52 |
| 4,161,341 | 7/1979 | Reinecke et al. | 303/52 |
| 4,166,654 | 9/1979 | Snodgrass | 303/14 |
| 4,576,416 | 3/1986 | Muller et al. | 303/14 |
| 4,818,036 | 4/1989 | Reinecke | 303/20 |
| 4,819,992 | 4/1989 | Angelillo | 303/20 |
| 4,861,115 | 8/1989 | Petersen | 303/14 |
| 5,129,712 | 7/1992 | Feldmann et al. | 303/15 |
| 5,145,239 | 9/1992 | Meise et al. | 303/15 |
| 5,251,966 | 10/1993 | Friederichs et al. | 303/15 |
| 5,294,190 | 3/1994 | Feldmann et al. | 303/15 |

FOREIGN PATENT DOCUMENTS

| | | |
|---|---|---|
| 0267881 | 11/1991 | European Pat. Off. |
| 26 19 775 | 6/1978 | Germany |
| 3308279 | 9/1983 | Germany |
| 33 44 252 | 6/1984 | Germany |
| 3841749 | 6/1990 | Germany |

Primary Examiner—Douglas C. Butler
Attorney, Agent, or Firm—Hopkins & Thomas

[57] ABSTRACT

An operating brake valve for an electrically and pneumatically actuated braking system in a motor vehicle has a movable thrust piece (2) arranged within a housing (1) and a balance piston (4) actuated via a graduated spring (3), whereby a combined inlet/exhaust valve (7, 9, 10) is arranged downstream of the balanced piston. A position sensor (20) is provided which can be actuated via a push rod (17) connected to the thrust piece (2). A stop valve (29) is located in the connecting line (26) to the reservoir (12) or in the control line (15) coming from the balance chamber, whereby an electrically controlled solenoid valve (40) is provided for actuating the stop valve and, in the nonexcited state, for relieving the valve body of the stop valve (29) opposite to its closing direction.

14 Claims, 5 Drawing Sheets

OPERATING BRAKE VALVE FOR AN ELECTRICALLY AND PNEUMATICALLY ACTUATED BRAKING SYSTEM IN A MOTOR VEHICLE

FIELD OF THE INVENTION

The invention refers to a operating brake valve for an electrically and pneumatically actuated braking system in a motor vehicle, having a movable thrust piece arranged within a housing and a balance piston which can be actuated via a graduated spring, whereby a combined inlet/exhaust valve, equipped with a reservoir and which can be linked via a connecting line to a compressed air supply, is connected downstream of said piston, and having a position sensor which can be actuated via a push rod connected to the thrust piece. Such an operating brake valve serves for finally converting a control action to be given by the driver into a compressed air actuation of the brake cylinder in the braking system, or to transfer said action to said brake cylinder, for the purpose of initiating and executing the braking of a motor vehicle. The invention described in this document does not depend on whether the operating brake valve is designed with one or more circuits.

BACKGROUND OF THE INVENTION

An operating brake valve of the above type is known from DE-OS 3841749. Here, the position sensor is housed in the body of the double valve for the combined inlet/exhaust valve and hence in the exhaust duct leading to the atmosphere. The operating brake valve is employed in the scheme of a braking system with more than one circuit in which the brakes are actuated using means of compression and in which the braking circuit assigned to the front axle of the motor vehicle is controlled via the pneumatic section of the operating brake valve. An electrical signal is obtained from the position sensor, which reproduces the path of the thrust piece in the operating brake valve housing, and fed to an electronic control unit. From here, a second braking circuit, assigned to the rear axle of the motor vehicle, branches off as an automated sequence control. This second braking circuit is operated electrically, in fact depending on the first circuit which can be actuated pneumatically. The control unit enables other parameters to also be brought in to modulate and influence the braking pressure in the second circuit.

An operating brake valve is known from EP-0 267 881 B1 in which a linear potentiometer is assigned to the thrust piece to act as a position sensor for retarded control. An operating brake valve is known from DE-PS 26 19 775 in which the electrical control of a retarder is carried out via a multiple contact switch which is wired in the path of the thrust piece.

A multicircuit braking system for heavy road vehicles is known from DE-OS 33 44 252 in which an operating brake valve is used which is designed to be partly pneumatic and partly electric. A pneumatic control of the brake cylinder for the front axle is carried out via the pneumatic part. A sensor is housed in the electric part and this sends a current signal to an electronic control unit which, in the first place, electrically controls the braking circuit assigned to the rear axle. However, the electronic control unit also controls solenoid valves which are assigned to the front axle braking circuit. The respectively higher supply pressure is sent to the brake cylinder as braking pressure via 2-way valves.

SUMMARY OF THE INVENTION

It is the object of the invention to make available an operating brake valve, the main parts of which can be checked for correct operation at the start of the journey and that when the parts are functioning correctly, electrical operation of the braking system is possible as well as, in an emergency, pneumatic actuation.

According to the invention, this is achieved with a operating brake valve of the type described above in that a stop valve is located in the connecting line to the reservoir or in the control line for the inlet/exhaust valve coming from the balance chamber, whereby an electrically controlled solenoid valve is provided for the actuation of said stop valve and, in the non-excited state, for relieving the valve body of the stop valve opposite to its closing direction.

With the invention-type construction of the operating brake valve, two essential functions are achieved at the same time. Firstly, it will be possible, upon starting a journey, to check the correct functioning of the main parts of the operating brake valve and, secondly, to enable the same parts to utilize a pneumatic signal for controlling the service brake in an emergency, i.e. if a fault occurs in the electrical parts of the operating brake valve or in the electronic control unit of a downstream installation, instead of using the controlled electrical signal of the operating brake valve. This results in the possibility of activating the engine of the motor vehicle after switching on the ignition and topping up the reservoir via the conventional compressed air supply system. When the designed reservoir pressure has been reached, this can be indicated to the driver via a manometric switch or pressure sensor. The driver can then test the operation of the operating brake valve using his/her foot in the normal way and, on the other hand, by means of a manometric switch, manometer or similar, establish whether and what actuating pressure is being adjusted and whether and what signal from the position sensor is being sent corresponding to the path which has been traced. During this operation of the operating brake valve the solenoid valve has not yet been actuated, i.e. it is still in its non-excited state. If then, in addition, the solenoid valve is excited, which, for example, can be achieved by means of another switch to be operated by the driver or via an electronic control unit for the braking system, the stop valve is closed so that further compressed air cannot flow into the reservoir. A continuation of the braking procedure will then be noticeable through a rising signal from the position sensor and a signal of the pressure in the driven line which remains constant. Correct functioning of the main parts of the operating brake valve are checked in this way and the solenoid valve remains excited after the check too so that the stop valve does not leave its off position. During the subsequent journey, only the electrical signal provided by the position sensor is used for controlling the operating brake, while the pneumatic adjustment is suppressed. However, if a fault occurs in the electrics, the solenoid valve will then be dead or switched to dead respectively so that the pneumatic control signal of the operating brake valve is available for further braking procedures.

In order to render possible an automatic check of the main parts of the operating brake valve at the start of a journey, another electrically controlled solenoid valve is provided, the balance piston has, on the control side, an effective (active) area, and the position sensor has a piston/cylinder unit in the actuating direction of the push rod, whereby both can be acted upon by the further solenoid valve. This results in the possibility of switching the two solenoid valves from one downstream electronic control and, in doing this, to allow the running of a test switching cycle which functions without the involvement of the driver. If the main parts of the operating brake valve are functioning correctly, then the test cycle is concluded such that the first solenoid valve remains excited and the stop valve fixed in its off position, while in an emergency, i.e. if the electrics fail, the electrical signals are suppressed and the pneumatic output signal is utilized for controlling the service brake.

The solenoid valve or solenoid valves has/have a supply connection and a vent connection. The solenoid valves are, therefore, provided with a supply connection, enabling the respective desired effective area or effective area subsection to be controlled in order to bring about a certain checking movement or switching movement. On the other hand, in the non-excited state, the solenoid valves serve for venting the effective areas or parts of the effective areas.

The stop valve can have a differential piston as a valve body which works together with an inwardly-protuding edge and is built in with its closing direction in the throughflow direction of the compressed air. This can be the case not only in the region of the supply line but also in the control line coming from the balance chamber. By designing the valve body as a differential piston it is ensured that the opening force exerted on the valve body is always less than a closing force exerted by the compressed air on the valve body in the closing direction.

The valve body of the stop valve can be acted upon in the closing direction by the force of a closer spring and, opposite to the closing direction, has as the effective area subsection acted upon by the reservoir pressure or the adjusted pressure. This effective area subsection allows the stop valve to open in the case of a fault in order to, therefore, at all times enable the reservoir to be supplied with compressed air or the control pressure via the control line coming from the balance chamber to be adjusted respectively.

The position sensor and/or the piston/cylinder unit allocated to it can be safely located in a separate section of the housing for the operating brake valve. This means that the position sensor is in any case not located in the exhaust stream of the combined inlet/exhaust valve but rather in an extension to the housing so that, on the one hand, it is safely housed and, on the other, an actuating chamber is created for the test position.

It is advantageous if the piston/cylinder unit of the position sensor can be actuated independently of the push rod and the piston of the piston/cylinder unit is supported on a return spring. The play in the push rod connection to the thrust piece is thus eliminated and, at the same time, the tracing of a greater path than that which corresponds to the maximum travel of the push rod in the maximum operating brake position is made possible during the test operation of the piston in the piston/cylinder unit. In doing this, the total normal stroke of the position sensor is travelled in the test position. The construction of the balance piston is simplified by the special arrangement of the piston/cylinder unit assigned to the position sensor; the balance piston only requires a relatively small effective area for bringing about the test position, whereby said effective area can be acted upon via the further solenoid valve.

A manometric switch or pressure sensor can be located in the connecting line to the reservoir and/or in the control line coming from the balance chamber in order to check the pressure at these points, convert them into an electrical signal and indicate them to the driver.

With the construction in mind and with certain differences in the function, there results the possibility of either arranging both solenoid valves in the region of the connecting line leading to the reservoir of the combined inlet/exhaust valve or, however, arranging one solenoid valve in the region of the control line coming from the balance chamber and the other solenoid valve in the region of the connecting line leading to the reservoir of the combined inlet/exhaust valve.

BRIEF DESCRIPTION OF THE DRAWINGS

The invention will be further explained and described by means of preferred embodiment examples. There is shown.

DETAILED DESCRIPTION

Figure 1:
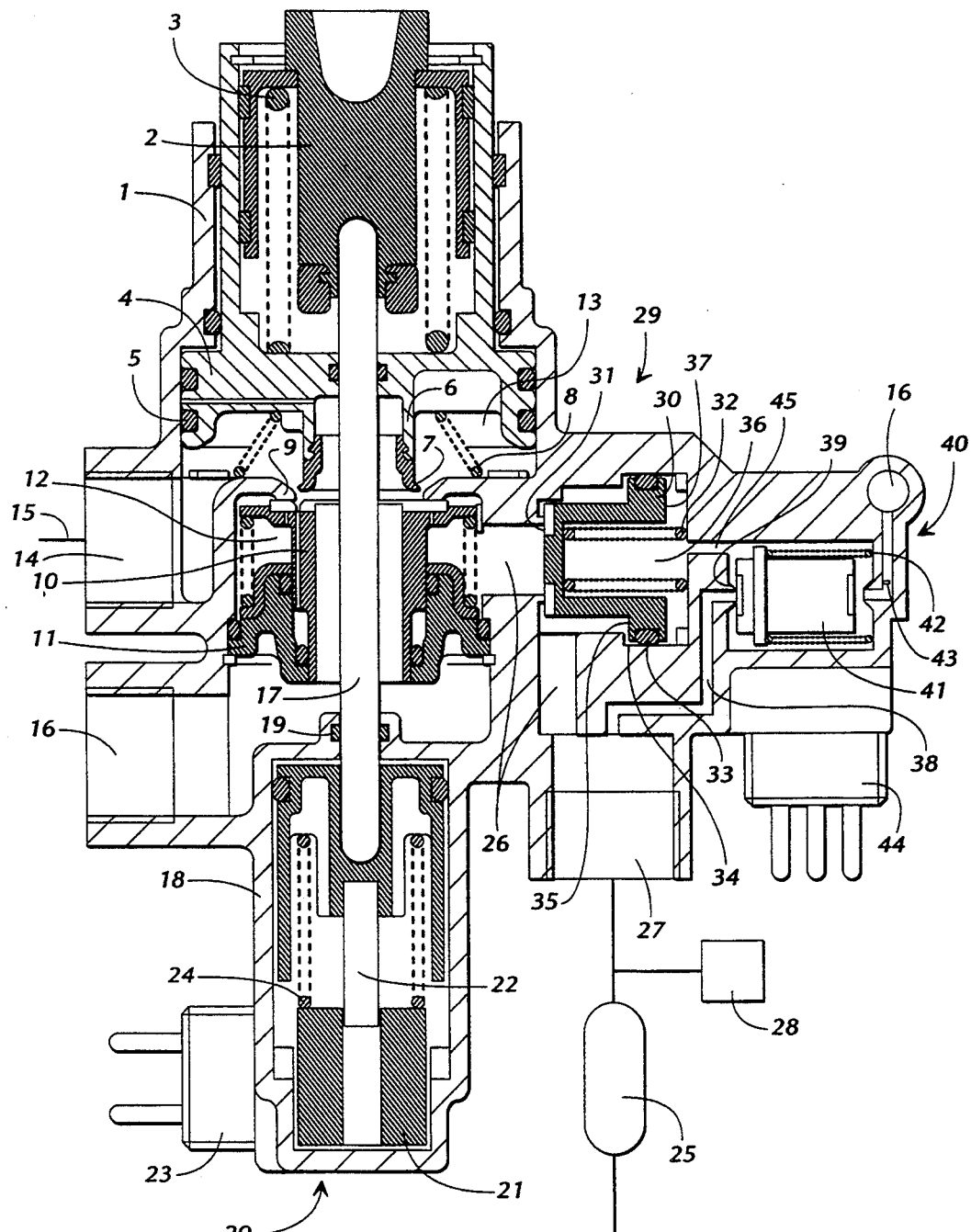
FIG. 1 is a cross-section through a first embodiment version of the operating brake valve.

The operating brake valve illustrated in FIG. 1 has a housing 1 which can also be usefully constructed in several parts. Several housing parts can be provided which receive the individual elements respectively and are interconnected accordingly via lines. Mounted in a known manner so that it may move in the housing 1 is, firstly, a thrust piece 2 which is normally pressed down by a foot pedal. The thrust piece is supported on a regulating spring 3 which, at its other end, loads a balance piston 4 which has at least one seal 5 and supports an exhaust valve seat 7 in the region of a hollow extension piece 6. The balance piston 4 is supported on the housing side by a weak spring 8.

Approximately in the central region of the housing 1 there is a inwardly protruding edge 9 which together with a spring-suspended double valve body 10 forms an inlet valve 9, 10. The double valve body 10 together with the exhaust valve seat 7 forms an exhaust valve 7, 10. Therefore, a reservoir 12 for compressed air is formed via an insert 11 also provided in the housing. A balance chamber 13 is formed below the balance piston 4 and above the inlet valve 9, 10, whereby, for example, a control line 15 coming from the balance chamber 13, via which a pneumatic control signal is adjusted in the appropriate case, is connected to said balance chamber via a connection 14, and whereby said pneumatic control signal finally leads either directly, or via a relay valve wired connected in series, to a pneumatic actuation of the brake cylinder in the braking circuit concerned. The double valve body 10 is constructed hollow for venting purposes and is permanently connected to a vent 16.

A push rod 17 is provided which, at one end, is supported on the thrust piece 2 and which passes through the balance piston 4 as well as the extension piece 6 and the double valve body 10. The push rod 17 projects into a separate housing extension 18, whereby a seal 19 is provided there. A position sensor 20 is accommodated in the housing extension 18, whereby the main parts of said sensor consist of a movable core 22 in a coil 21 meaning that the position sensor 20 is in the position to supply a transformed electrical signal corresponding to the path via a plug 23. The push rod 17 is supported via a return spring 24 so that the operating range of the position sensor 20 is kept free of play via the push rod 17.

A connecting line 26 leads from the compressed air supply tank 25, which is connected to a compressed air supply system, via a connection 27 and finally to the reservoir 12 of the inlet valve 9, 10. Located in this connecting line is, firstly, a manometric switch 28 or a different pressure sensor in order to gain an indication or signal respectively which corresponds to the pressure which has been reached in the compressed air supply tank 25. The manometric switch 28 can also be provided integrated into the housing 1 of the operating brake valve.

Also provided in the connecting line 26 is a stop valve 29 with a valve body formed as a piston 30 and built in in the direction shown. The piston 30 forms, with an edge 31, a shut-off valve 30, 31. The piston 30 is supported on a spring 32 on the housing side in the closing direction and has a seal 33. The piston 30 is mounted so that it may move sealed in a cylinder 34, whereby an effective area subsection 35, formed as an annular area and acted upon permanently by the reservoir pressure in the connecting line 26, is created between the shut-off valve 30, 31 and the seal 33. On the other side, i.e on the side of the spring 32, an effective space 36 and an circular effective area 37 are formed on the piston 30. The effective area 37 is greater than the effective area subsection 35.

A line 38 for supply air leads from the connecting line 26 or the connection 27 respectively to an inlet seat 39 of a solenoid valve 40, the armature 41 of which is loaded in such a way by a spring 42 that the inlet valve 39, 41 of the solenoid valve 40 is closed. On the other hand, the solenoid valve 40 is equipped with its own ventilation, i.e. a line 43 leads to a vent 16. It can be seen that, without any further effort, the two vents 16 can also be provided as a single vent or linked to each other respectively. The solenoid valve 40 can be controlled electrically via a plug 44. In the non-excited state, as illustrated, the inlet valve 39, 41 is closed and the effective space 36 of the stop valve 29 is connected to the atmosphere via a line 45.

In the unpressurized, no-current state, the parts of the operating cylinder are located in the relative positions shown in FIG. 1. After switching on the vehicle's ignition, the compressed air supply system is activated and the supply pressure builds up gradually in compressed air supply tank 25. While doing this, compressed air also strikes the effective area subsection 35 of the stop valve 29 so that the shut-off valve 30, 31 is opened and compressed air flows into the reservoir 12. As this happens, the manometric switch 28 indicates when the specified supply pressure in the compressed air supply tank 25 has been reached and sends an appropriate signal to the driver indicating that he/she can and should now carry out a check on the functions of the main parts of the operating brake valve. Subsequently depressing the thrustpiece 2 on the one hand closes the exhaust valve 7, 10 and opens the inlet valve 9, 10 so that a corresponding pressure is adjusted in the control line 15 which may be indicated to the driver via a manometer or another pressure sensor. Parallel to this, the position sensor 20 is also actuated and an electrical signal ensues which is proportional to the path which has been traced. This signal too can be indicated to the driver or registered in some other way. The occurrence of the two signals described indicates the operation of the inlet valve 9, 10 and its compressed air supply to the driver as well as the operation of the position sensor 20. In order to further check the operation of the stop valve 29 and the solenoid valve 40, the solenoid valve 40 is excited either by the driver or by an electronic control unit so that its inlet is opened and its exhaust closed. Hence, compressed air flows from the compressed air supply tank 25, via the line 38, into the effective space 36 and onto the effective area 37 of the piston 30 so that the stop valve 29 is transferred into its off position and the reservoir 12 is barred to the further influx of compressed air from the compressed air supply tank 25. Further actuation of the service brake valve through continued depression of the thrust piece is then indicated by a climbing signal from the position sensor 20 and by the pressure in the control line 15 remaining constant. This concludes the check on the solenoid valve 40 and the stop valve 29 and the vehicle's journey may begin. As, therefore, the main parts of the operating brake valve have shown themselves to be functioning correctly, the solenoid valve 40 remains excited so that no pressure is adjusted in control line 15 upon operation of the brakes during the journey. Merely the signal supplied by position sensor 20 and proportional to the path is used in order to control the operating brake of the vehicle. If during the journey a fault occurs in the electrical section of the operating brake valve or the downstream controlling electronics, then the solenoid valve 40 will be dead or switched to dead so that the effective space 36 is vented again. The supply pressure present causes the piston 30 of the stop valve 29 to leave its off position and compressed air is fed into the reservoir 12 so that a pneumatic signal results in the control line 15, via which the operating brake is triggered in this emergency. The operating brake valve illustrated in FIG. 2 corresponds in many respects with the operating brake valve according to FIG. 1 and, therefore, the reader is referred to the foregoing for a description of the actual elements of the system. However, the position sensor 20 is in this case equipped with a piston/cylinder unit 46, whereby an actuating chamber 48 is created which leads via a line 49 to a solenoid valve 50, from where it can be activated. The solenoid valve 50 is constructed and equipped in the same way as was already described by means of solenoid valve 40. It is connected to the compressed air supply tank 25 via a line 51 which branches off from line 38. The solenoid valve 50 possesses its own vent which leads to the common vent 16.

Here, the stop valve 29 has a differential piston 52, whereby the effective area subsection 35 acted upon by the supply pressure is formed between the edge 31 and a seal 53. The intermediate space between the seals 33 and 53 is vented via a line 54. This guarantees that the total from the circular area enclosed by the edge 31 and the effective area subsection 35 is less than the effective area 37.

It is not only line 49 that leads from solenoid valve 50 to the actuating chamber 48 for the test operation of the position sensor 20; a further line 55 leads to an effective area 56 on the balance piston 4 which is formed between seals 57 and 58.

Figure 2:
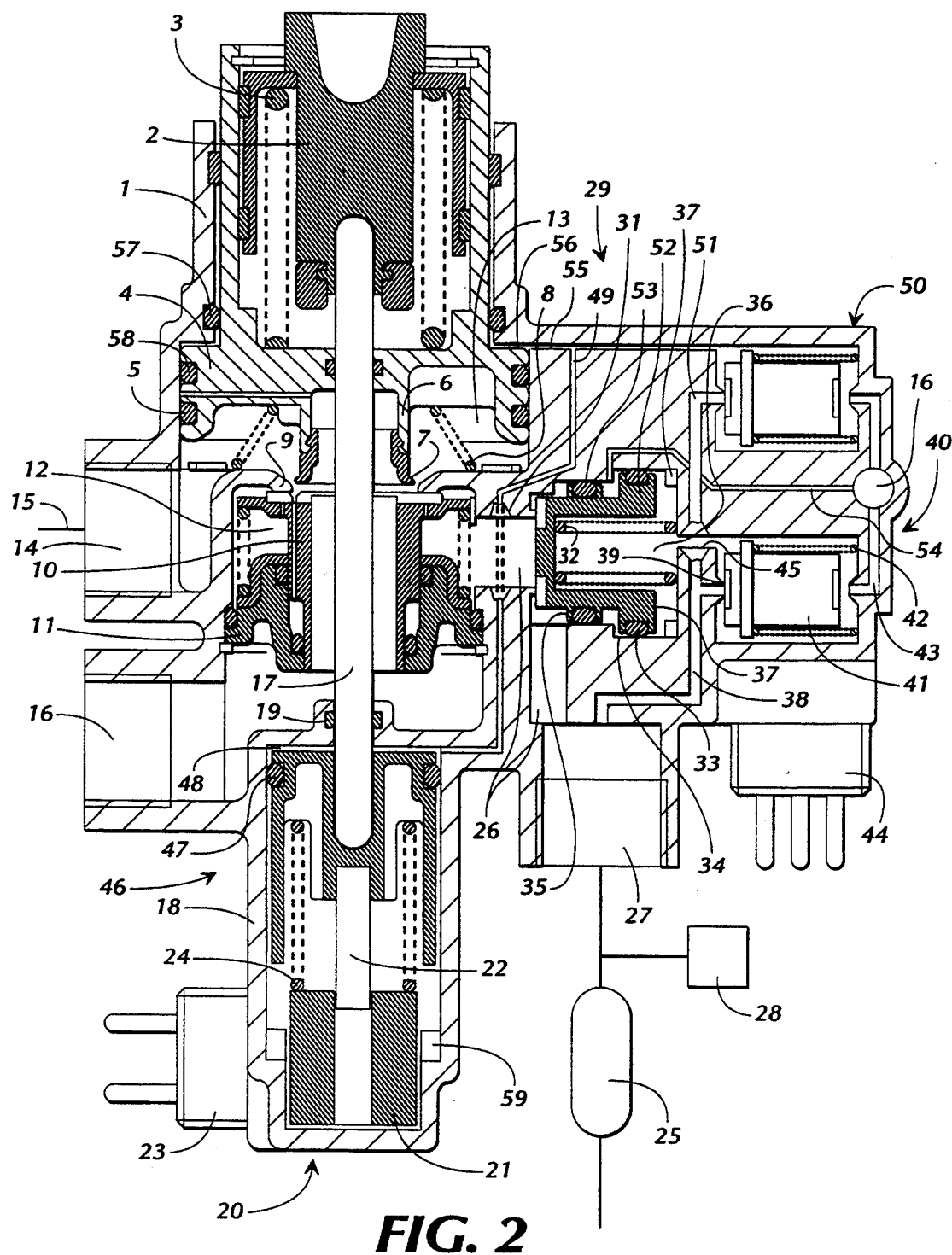
FIG. 2 is a cross-section through a second embodiment version of the operating brake valve in which an automatic check for the correct functioning of the main parts of the operating brake valve is possible.
Figure 3:
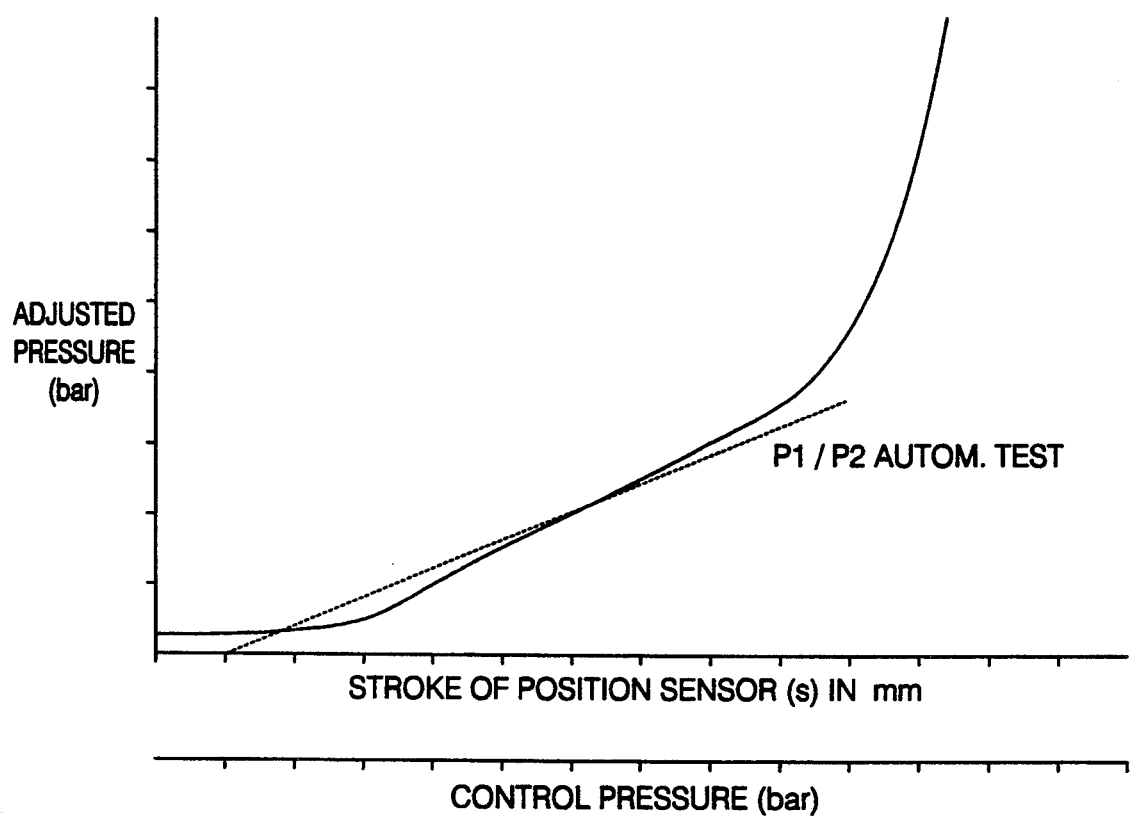
FIG. 3 is a diagram of the adjusted pressure in relation to the control pressure of the operating brake valve according to FIG. 2.

FIG. 3 shows a diagram of the adjusted pressure in relation to the control pressure or the stroke of the position sensor 20 respectively in the operating brake valve according to FIG. 2. In the case of normal operation of the brakes during the journey, an effect corresponding to the solid line results, while the characteristic line of the automatic test is shown dotted. Such an automatic test can run as follows.

After switching on the ignition, the parts are positioned as shown in FIG. 2, i.e. the two solenoid valves 40 and 50 are dead and closed. The pressure in the compressed air supply tank 25 is now topped up. The manometric switch 28, the plug 23 of the position sensor 20 and the plug 44 for the two solenoid valves 40 and 50 are connected to an electronic control unit which is not illustrated. The pressure building up in the compressed air supply tank 25 now also strikes the effective area subsection 35 and leads to the opening of the stop valve 29 because the differential piston 52 is vented on its effective area 37. Therefore, the supply pressure is also present in the reservoir 12 in front of the closed inlet valve 9, 10. As soon as the manometric switch 28 indicates that the planned supply pressure in the control unit has been reached, the solenoid valve 50 is excited, while the solenoid valve 40 remains non-excited. Hence, supply air strikes, on the one hand, the effective area 56 of the balance piston 4 and, on the other hand, the piston/cylinder unit 46 of the position sensor 20. The balance piston 4 performs a corresponding stroke, while the thrust piece 2 and the push rod 17 remain stationary. The exhaust valve 7, 10 is closed and the inlet valve 9, 10 is opened so that an actuating pressure determined by the dimensions of the effective area 56 is adjusted in the control line 15 depending on the supply pressure. The final position results between balance piston 4 and double valve body 10. The adjusted pressure is determined via a manometric switch connected to the control line 15 or via another pressure sensor which is also connected to the electronic control unit, or, respectively, an appropriate signal is sent which represents attainment or non-attainment of the correct, adjusted test pressure.

The piston of the piston/cylinder unit 46 performs its full stroke, whereby the return spring 24 is compressed and the piston sits on a buffer 59. This test stroke is longer than that which corresponds to the stroke of the piston during normal maximum operation of the brakes. This guarantees that the full operational stroke of the position sensor 20 is traversed during the test stroke and, on the other hand, upon the adjustment of maximum braking during the journey, the piston of the piston/cylinder unit 46 still remains in a floating position. During the test stroke, the signal supplied by the position sensor 20 is checked by the electronic control unit. If the test signals move within prescribed limits, then this means that the main parts of the operating brake valve are functioning correctly and, therefore, no emergency situation is present. In this case, the solenoid valves 40 and 50 are subsequently reversed, i.e. solenoid valve 40 is now excited, while solenoid valve 50 is dead. Consequently, solenoid valve 40 closes its exhaust and opens its inlet so that compressed air flows from the compressed air supply tank 25 onto the effective area 37 of the differential piston 52 in the stop valve 29. The stop valve 29 is preloaded in its off position so that the supply of further compressed air to the reservoir 12 is blocked. In contrast, solenoid valve 50 moves into the off position so that the effective area 56 and the actuating chamber 48 are vented, and meaning that not only the balance piston 4 but also the piston of the piston/cylinder unit 46 can return to its normal starting position, as shown in FIG. 2. This guarantees that, during the subsequent journey, only electrical signals ensue via the position sensor 20 which correspond to the respective path of the brake operation of the thrust piece 2. During the journey, the solenoid valve 40 is permanently supplied with current, i.e. is located in its other position, not illustrated in FIG. 2. If during the journey a fault occurs in the electrical section of the operating brake valve and/or the entire braking system is interrupted, then solenoid valve 40 will also be dead or be switched to dead so that the stop valve 29 no longer prevents the subsequent supply of compressed air to the reservoir 12. Then a pneumatic signal is again immediately adjusted via the control line 15 so that, in this fault situation, further braking is controlled through a pneumatic signal.

The dotted line in FIG. 3 shows that, for the test case, a constant translation ratio is used and it is not necessary to actuate or control respectively the balance piston 4 according to maximum braking. Hence, the effective area 56 can be designed relatively small, something that is advisable for a small overall size of operating brake valve. Nevertheless, the maximum stroke of the position sensor 20 is passed through.

Figure 4:
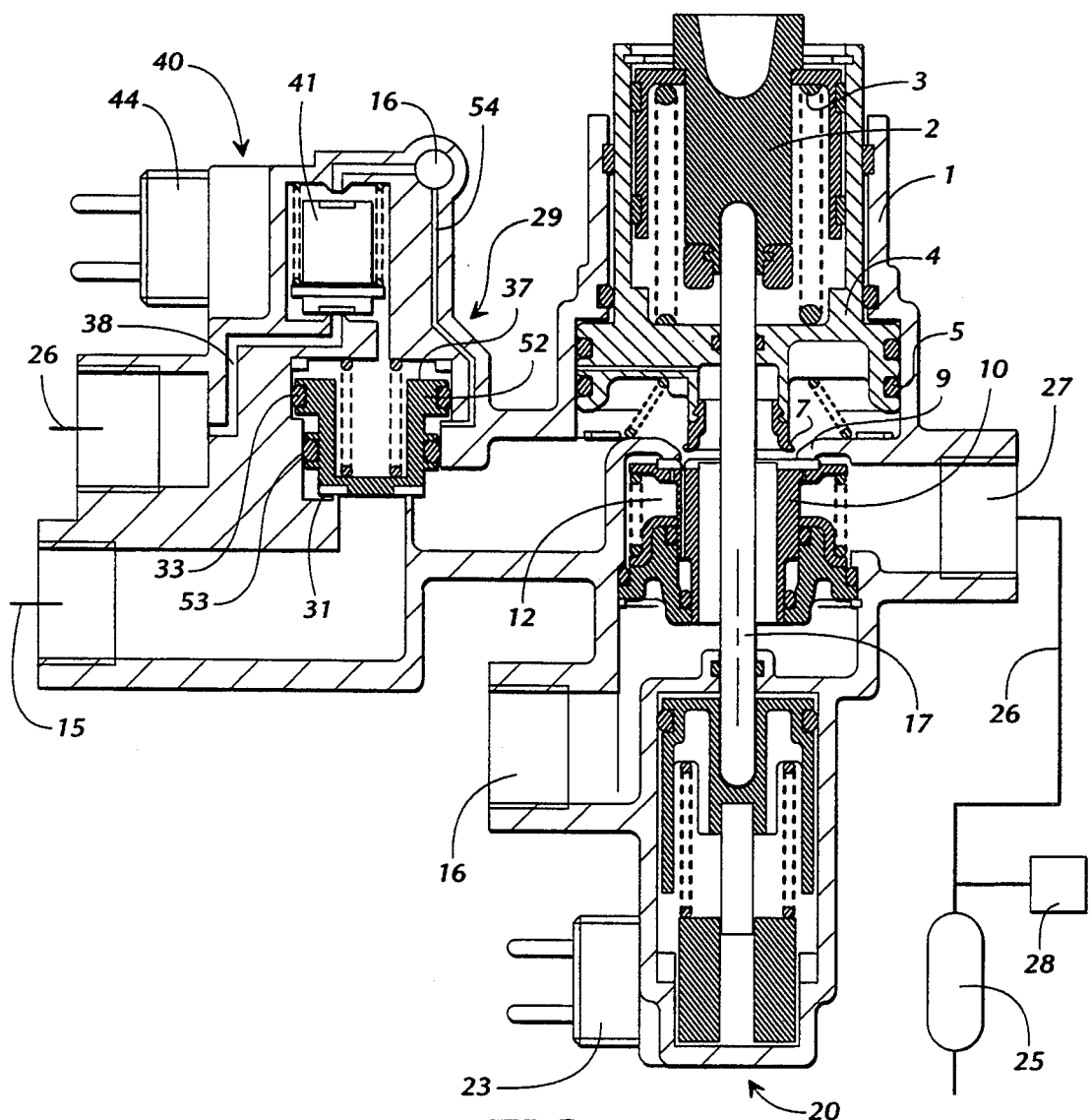
FIG. 4 is a third embodiment possibility of the operating brake valve.

FIG. 4 shows an embodiment version of the operating brake valve which, for the most part, corresponds to the embodiment version according to FIG. 1, i.e. just one solenoid valve 40 is provided. However, this solenoid valve 40 with the stop valve 29 controlled by it is, in contrast to the embodiment version according to FIG. 1, not located in the supply line, connecting line 26, but rather in the control line 50, i.e. on the control side. Hence, the reservoir 12 is in fact permanently supplied with compressed air and the balance piston 4 is also controlled and balanced upon each operation of the brakes. The further transmission of this controlled pressure is, however, prevented by the closed stop valve 29 if the parts of the operating brake valve are functioning correctly. Only in the case of a fault is the solenoid valve 40 also switched to dead here so that the controlled pressure can be used unhindered for the purposes of brake operation via control line 15. The function and attainment of the test position coincides for the most part with that of the embodiment example according to FIG. 1, and, in this respect, attention is drawn to the description given there.

Figure 5:
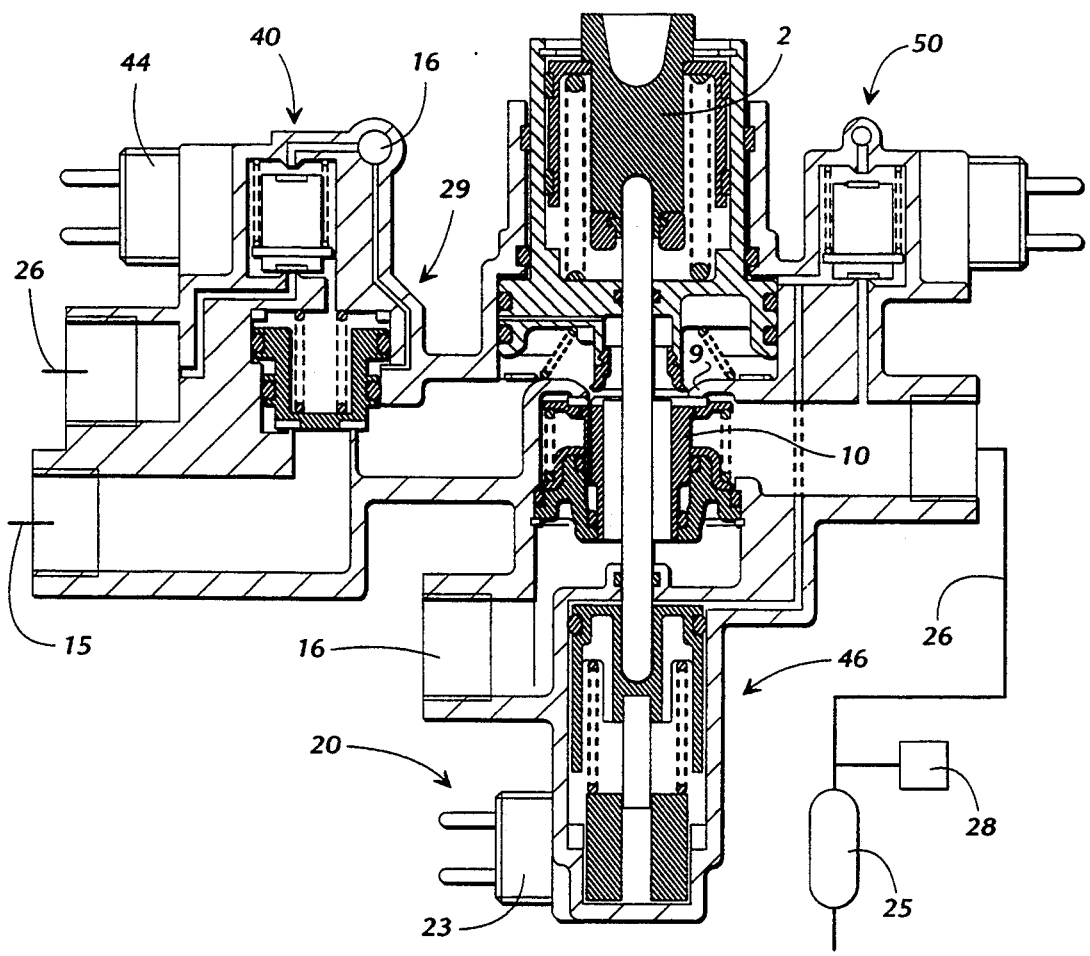
FIG. 5 is a fourth embodiment version of the operating brake valve.

FIG. 5 shows another embodiment version which, essentially, follows on from the embodiment version according to FIG. 2. The solenoid valve 50 is in this case provided on the control side, while the solenoid valve 40 is included within the associated stop valve 29 in the control line 15. The arrangement and switching-on of the solenoid valve 40 thus corresponds to the embodiment version according to FIG. 4. Automatic checking is also possible with the embodiment version of the operating brake valve according to FIG. 5, and the sense of this can be seen from the description of the operating brake valve according to FIG. 2. It is clear that the solenoid valves 40 and 50 can also be accommodated in a housing separate to the housing 1, whereby merely appropriate connecting lines need to be provided to the housing 1. Of course, the manometric switch 28 too may be provided at an appropriate point in the housing 1.

While preferred embodiments of the invention have been disclosed and illustrated herein, it will be understood by those skilled in the art that variations and modifications thereof can be made without departing from the spirit and scope of the invention, as described in detail in the following claims. Legend for Drawings 1 = Housing
2 = Thrust piece
3 = Graduated/regulating spring
4 = Balance piston
5 = Seal
6 = Extension piece
7 = Exhaust valve seat
8 = Spring
9 = Edge
10 = Double valve body
11 = Insert
12 = Reservoir
13 = Balance chamber
14 = Connection
15 = Control line
16 = Vent
17 = Push rod
18 = Housing extension
19 = Seal
20 = Position sensor
21 = Coil
22 = Core
23 = Plug/connector
24 = Return spring
25 = Compressed air supply tank
26 = Connecting line
27 = Connection
28 = Manometric/pressure switch
29 = Stop/shut-off valve
30 = Piston
31 = Edge
32 = Spring
33 = Seal
34 = Cylinder
35 = Effective/active area subsection
36 = Effective/active space
37 = Effective/active area
38 = Line
39 = Inlet face
40 = Solenoid valve
41 = Armature
42 = Spring
43 = Line
44 = Plug/connector
45 = Line
46 = Piston/cylinder unit
47 = Seal
48 = Actuating chamber/space
49 = Line
50 = Solenoid valve
51 = Line
52 = Differential/step piston
53 = Seal
54 = Line
55 = Line
56 = Effective/active area
57 = Seal
58 = Seal
59 = Buffer/stop

I claim:

1. An operating brake valve for an electrically actuated braking system in a motor vehicle with a pneumatically actuated emergency braking system responsive to movement of a brake actuator pedal of the motor vehicle, the braking system including a brake actuating mechanism, comprising:

a housing;

a balance piston for movement in said housing in response to the movement of the motor vehicle's brake pedal;

a graduated spring supporting said balance piston in said housing;

a thrust piece movably supported on said balance piston, wherein said thrust piece is moveable along its length within said housing in response to movement of the brake pedal;

an inlet and exhaust valve assembly mounted in said housing, wherein said valve assembly includes a compressed air reservoir, and wherein said valve assembly is actuated by said balance piston;

a compressed air supply;

a compressed air connecting line extending from said compressed air supply to said compressed air reservoir of said inlet and exhaust valve assembly:

a position sensor for generating an electric signal to operate the brake actuating mechanism:

a push rod, wherein said push rod depends from said thrust piece and extends toward said position sensor, wherein said push rod is moveable toward and away from said position sensor in response to the movement of said thrust piece with respect to said housing, and wherein said position sensor generates said electric signal in response to the movement of the push rod with respect to the position sensor;

a compressed air control line extending from said inlet and exhaust valve assembly toward the brake actuating mechanism;

a stop valve for controlling the supply of compressed air to the brake actuating mechanism through the brake valve, said stop valve having open and closed positions;

a first electrically actuated solenoid valve for moving said stop valve into said open and closed positions;

wherein said stop valve is initially held in its open position until a supply of compressed air is formed in said compressed air reservoir of said inlet and exhaust valve assembly and said first solenoid valve moves said stop valve into its closed position so that the brake actuating mechanism is operated by said electric signals generated from said position sensor, and said inlet and exhaust valve assembly is only actuated by said balance piston to pneumatically operate the braking mechanism of the motor vehicle in the event of an electrical failure in the motor vehicle.

2. The brake valve of claim 1, wherein said stop valve is located on said compressed air connecting line between said compressed air supply and said compressed air reservoir of said inlet and exhaust valve assembly.

3. The brake valve of claim 1, wherein said stop valve is located on said compressed air control line between said compressed air reservoir of said inlet and exhaust valve assembly and the brake actuating mechanism.

4. The brake valve of claim 1, further comprising:

a second electrically actuated solenoid valve for performing automated start-up testing of the brake valve;

wherein said balance piston has an effective area on which compressed air acts;

wherein said position sensor comprises a piston and cylinder assembly having a piston slidably held in a cylinder, and wherein said piston and cylinder assembly is actuated by said push rod;

wherein said effective area of said balance piston and said piston and cylinder assembly are both acted upon by compressed air passed through said second solenoid valve for the automated testing of the electrical operation and emergency pneumatic operation of the brake valve.

5. The brake valve of claim 4, wherein said second solenoid valve comprises:

a second compressed air line for passing compressed air from said compressed air connecting line to said second solenoid valve; and a vent for exhausting compressed air passed through said second solenoid valve to the atmosphere.

6. The brake valve of claim 4, wherein said housing has a separate housing extension, and wherein said position sensor is housed within said housing extension.

7. The brake valve of claim 6, wherein said piston and cylinder assembly is actuated independently of said push rod, and wherein said piston and cylinder assembly further comprises a return spring for urging said piston of the piston and cylinder assembly upwardly within said cylinder and away from said position sensor.

8. The brake valve of claim 4, wherein said first and second solenoid valves are located on said compressed air connecting line between said compressed air supply and said compressed air reservoir of said inlet and exhaust valve assembly.

9. The brake valve of claim 4, wherein said first solenoid valve is located on said compressed air control line between said compressed air reservoir of said inlet and exhaust valve assembly and the brake actuating mechanism, and wherein said second solenoid valve is located on said compressed air connecting line between said compressed air supply and said compressed air reservoir of said inlet and exhaust valve assembly.

10. The brake valve of claim 1, wherein said first solenoid valve comprises:

a first compressed air line for passing compressed air from said compressed air connecting line to said first solenoid valve; and a vent for exhausting the compressed air passed through said first solenoid valve to the atmosphere.

11. The brake valve of claim 1, wherein said stop valve comprises:

a valve body, wherein said valve body comprises a differential piston;

an annular edge portion formed within said housing, wherein said edge portion extends toward said differential piston;

wherein said differential piston is sealed on said edge portion while said stop valve is in its closed position to prevent compressed air from passing therethrough toward said brake actuating mechanism.

12. The brake valve of claim 1, wherein said stop valve comprises:

a valve body, wherein said valve body has an effective area subsection formed thereon for urging said valve body into the open position of said stop valve when compressed air is passed through said stop valve.

a closing spring, wherein said closing spring acts upon said valve body to urge said valve body into the closed position of said stop valve when said stop valve is actuated by said first solenoid valve.

13. The brake valve of claim 1, further comprising a manometric pressure switch located in said compressed air connecting line for measuring the pressure of the compressed air passed through said connecting line.

14. The brake valve of claim 1, further comprising a manometric pressure switch located in said compressed air control line for measuring the pressure of the compressed air passed through said control line.

* * * * *